No. 723,825. PATENTED MAR. 31, 1903.
J. W. BUTTERFIELD.
PAMPHLET BINDING MACHINE.
APPLICATION FILED JAN. 5, 1903.
NO MODEL. 11 SHEETS—SHEET 1.
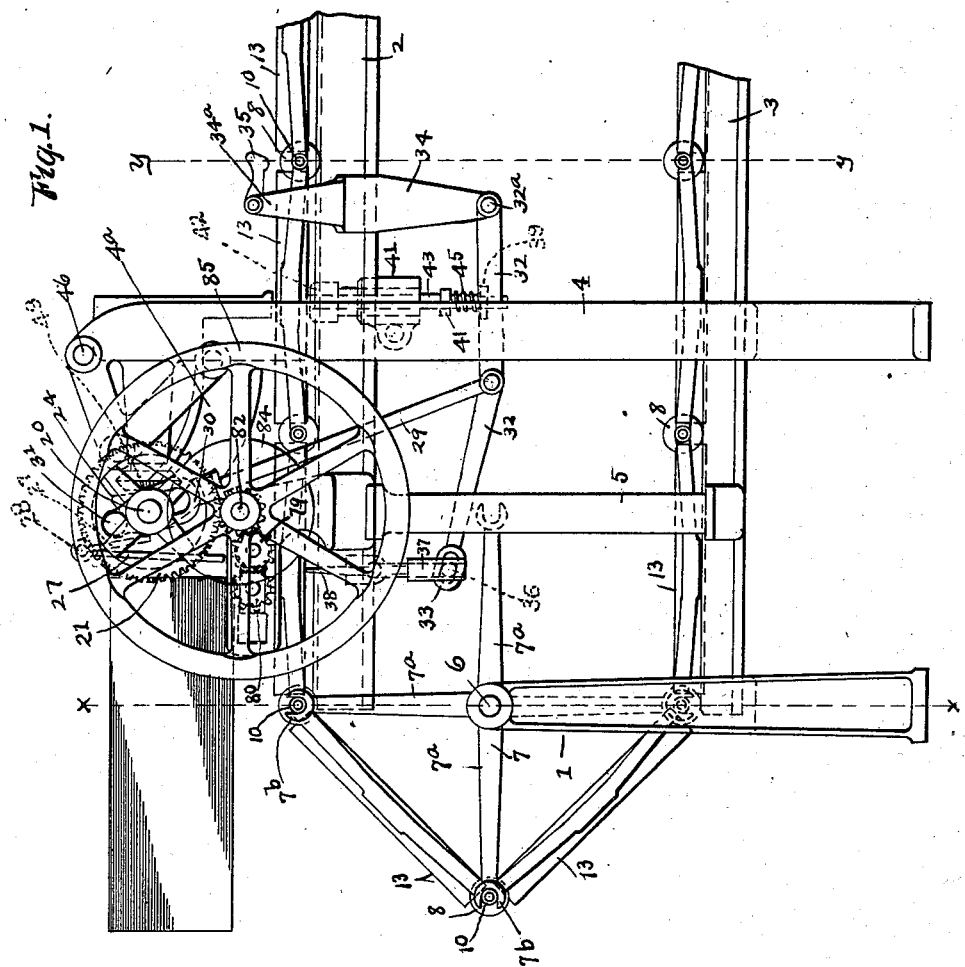
WITNESSES:
N. A. Nurdick
A. L. Phelps
INVENTOR
John W. Butterfield
BY
C. C. Shepherd
ATTORNEYS

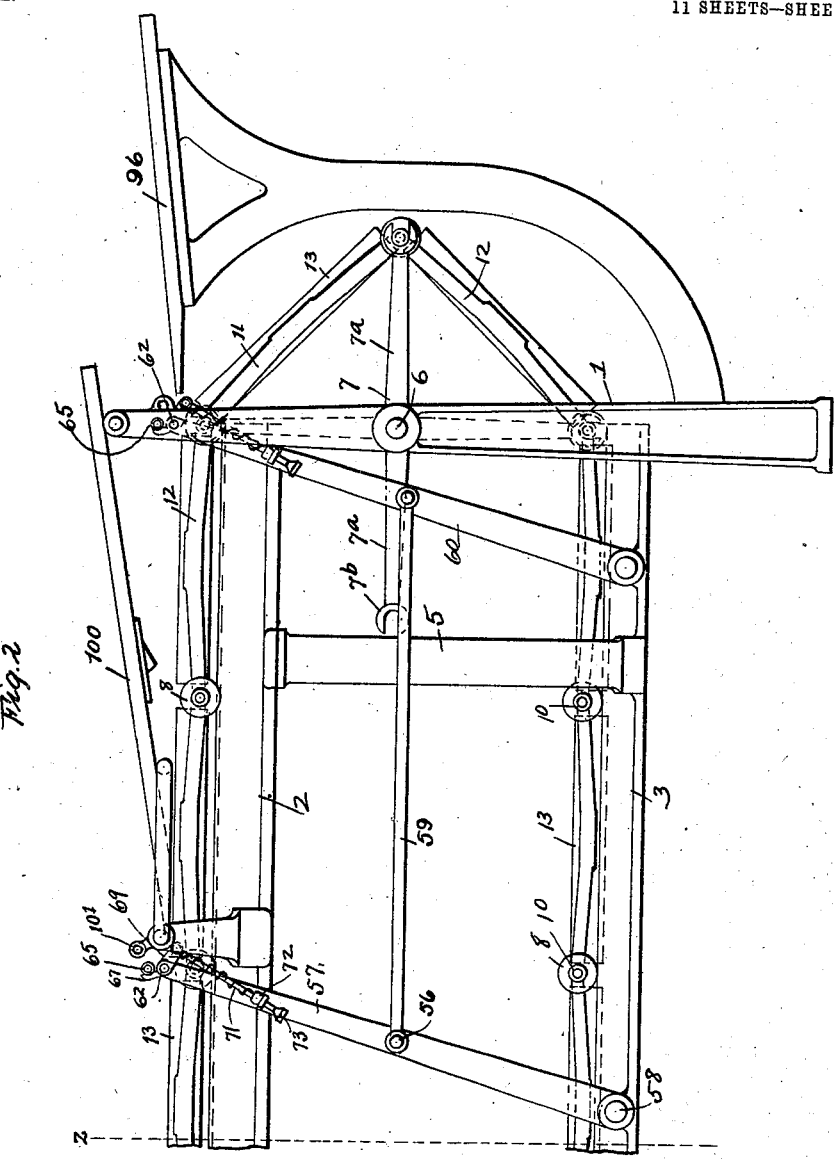

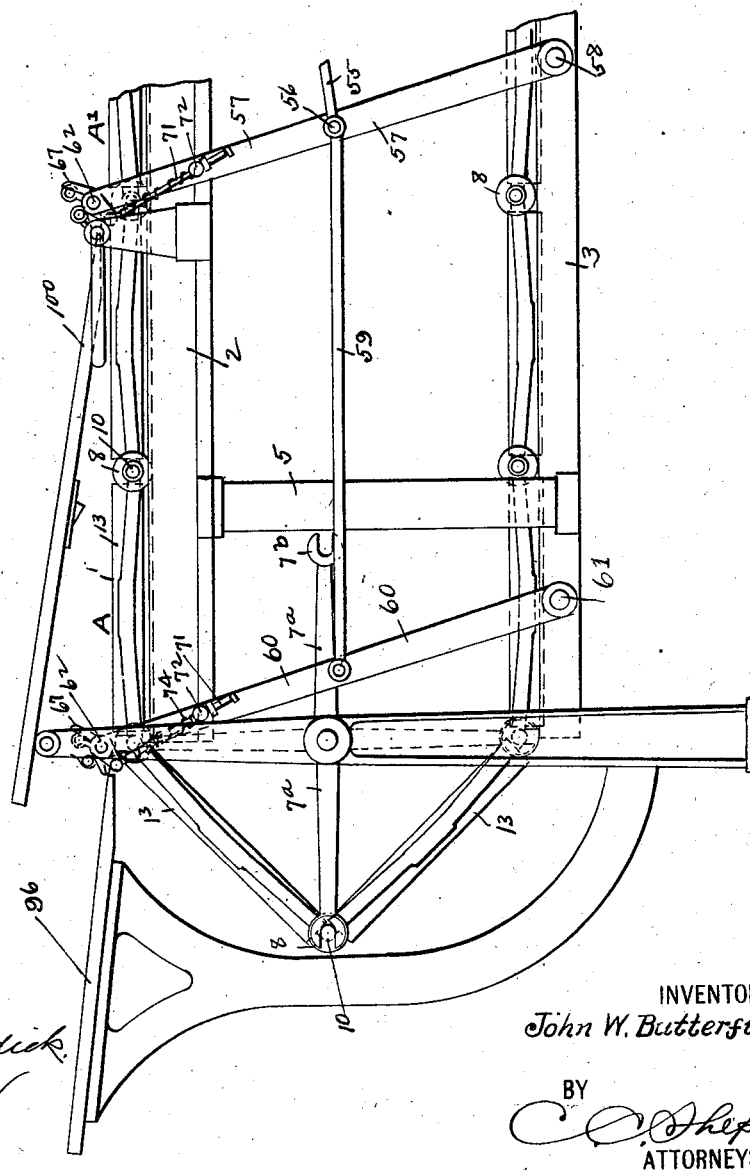

No. 723,825. PATENTED MAR. 31, 1903.
J. W. BUTTERFIELD.
PAMPHLET BINDING MACHINE.
APPLICATION FILED JAN. 5, 1903.
NO MODEL. 11 SHEETS—SHEET 4.
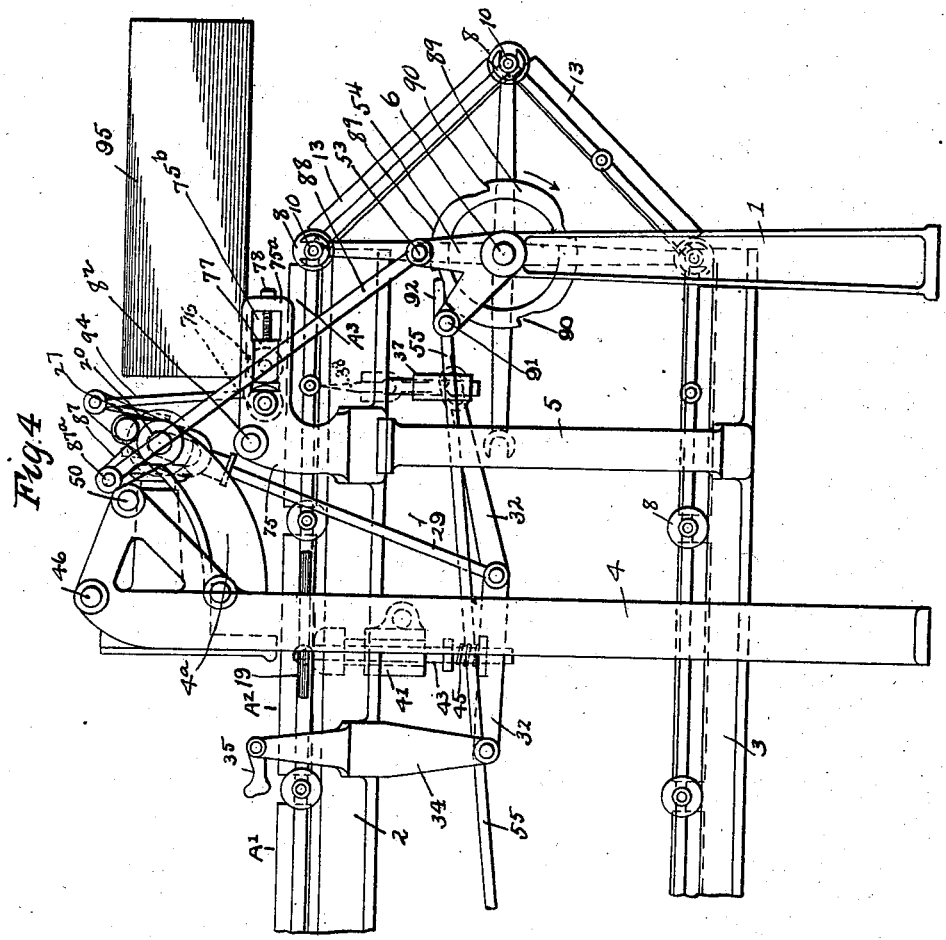
WITNESSES:
N. A. Nurdick
J. L. Phelps
INVENTOR
John W. Butterfield
BY
C. C. Shepherd
ATTORNEY No. 723,825. PATENTED MAR. 31, 1903.
J. W. BUTTERFIELD.
PAMPHLET BINDING MACHINE.
APPLICATION FILED JAN. 5, 1903.
NO MODEL. 11 SHEETS—SHEET 5.
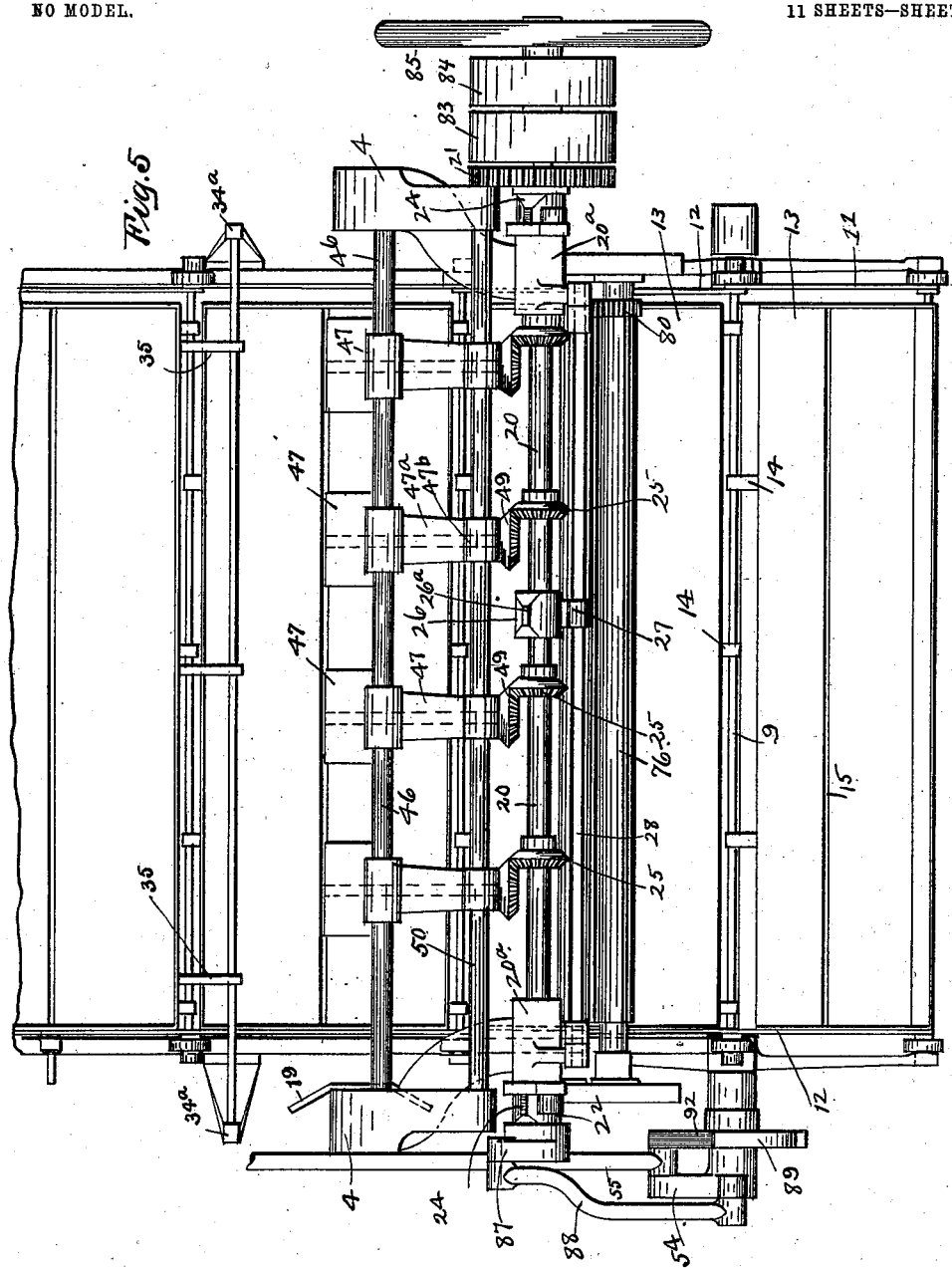
WITNESSES:
N. A. Nurdick
A. L. Phelps
INVENTOR
John W. Butterfield
BY
C. Shepherd
ATTORNEYS No. 723,825. PATENTED MAR. 31, 1903.
J. W. BUTTERFIELD.
PAMPHLET BINDING MACHINE.
APPLICATION FILED JAN. 5, 1903.
NO MODEL. 11 SHEETS—SHEET 6.
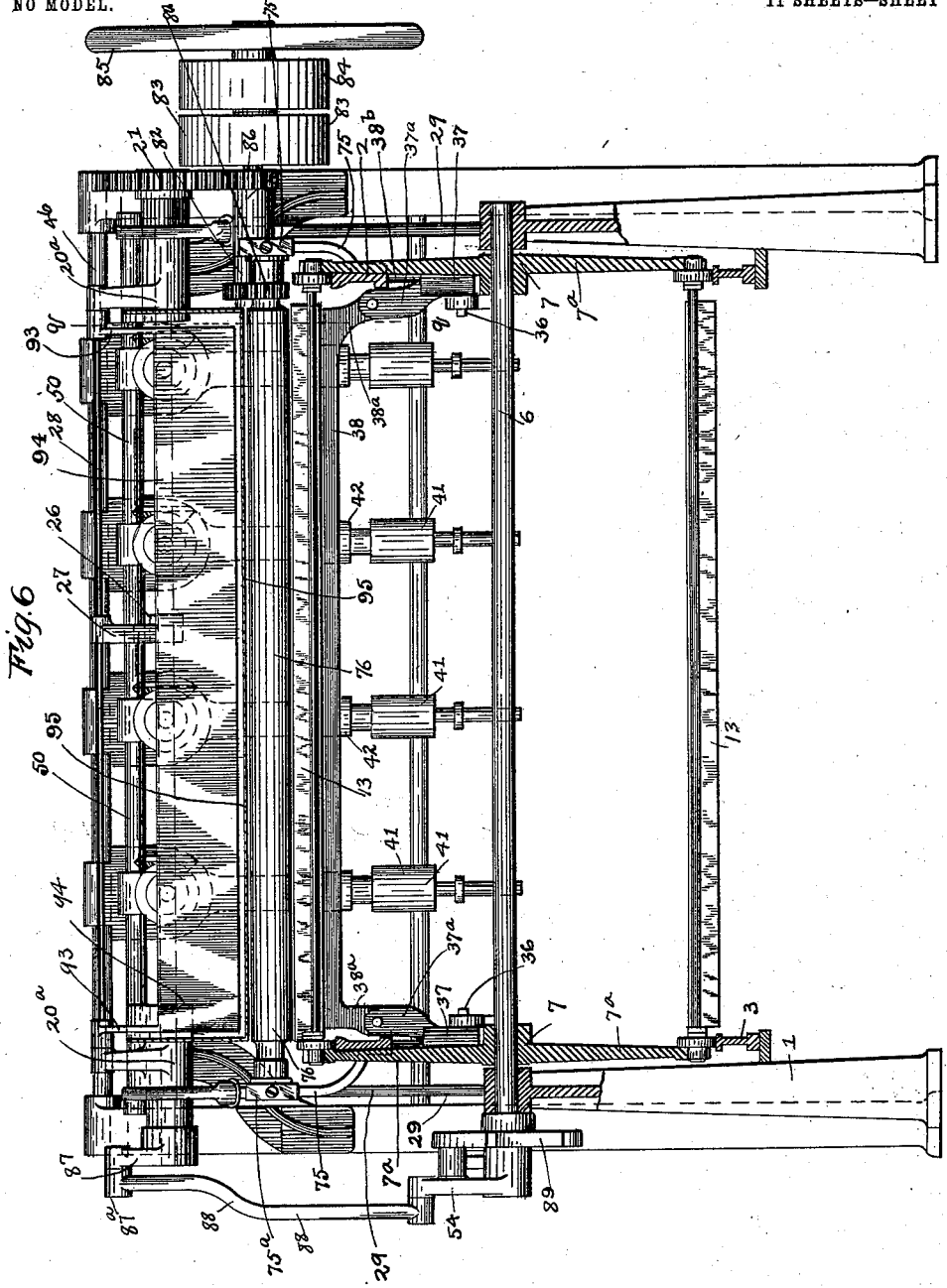
WITNESSES:
N. A. Newdick
A. L. Phelps
INVENTOR
John W. Butterfield
BY
C. C. Shepherd
ATTORNEYS

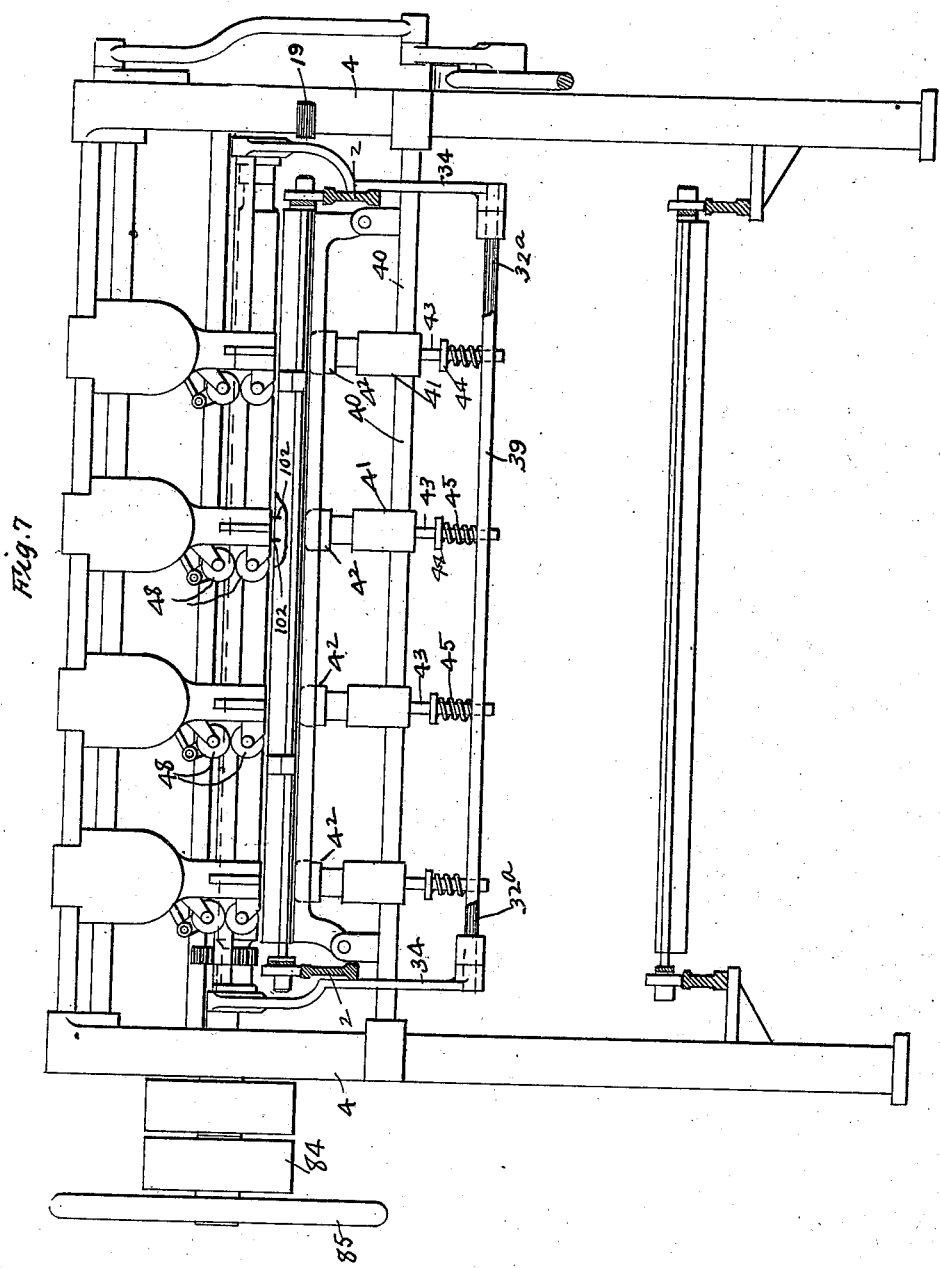

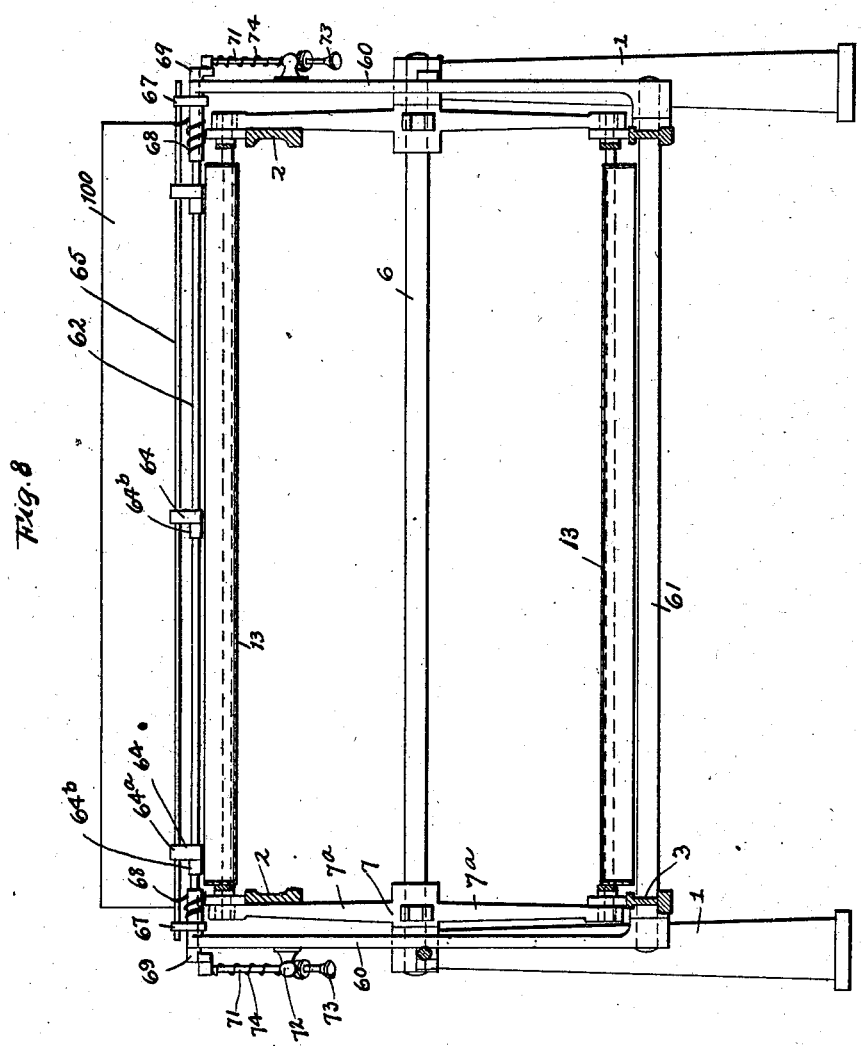

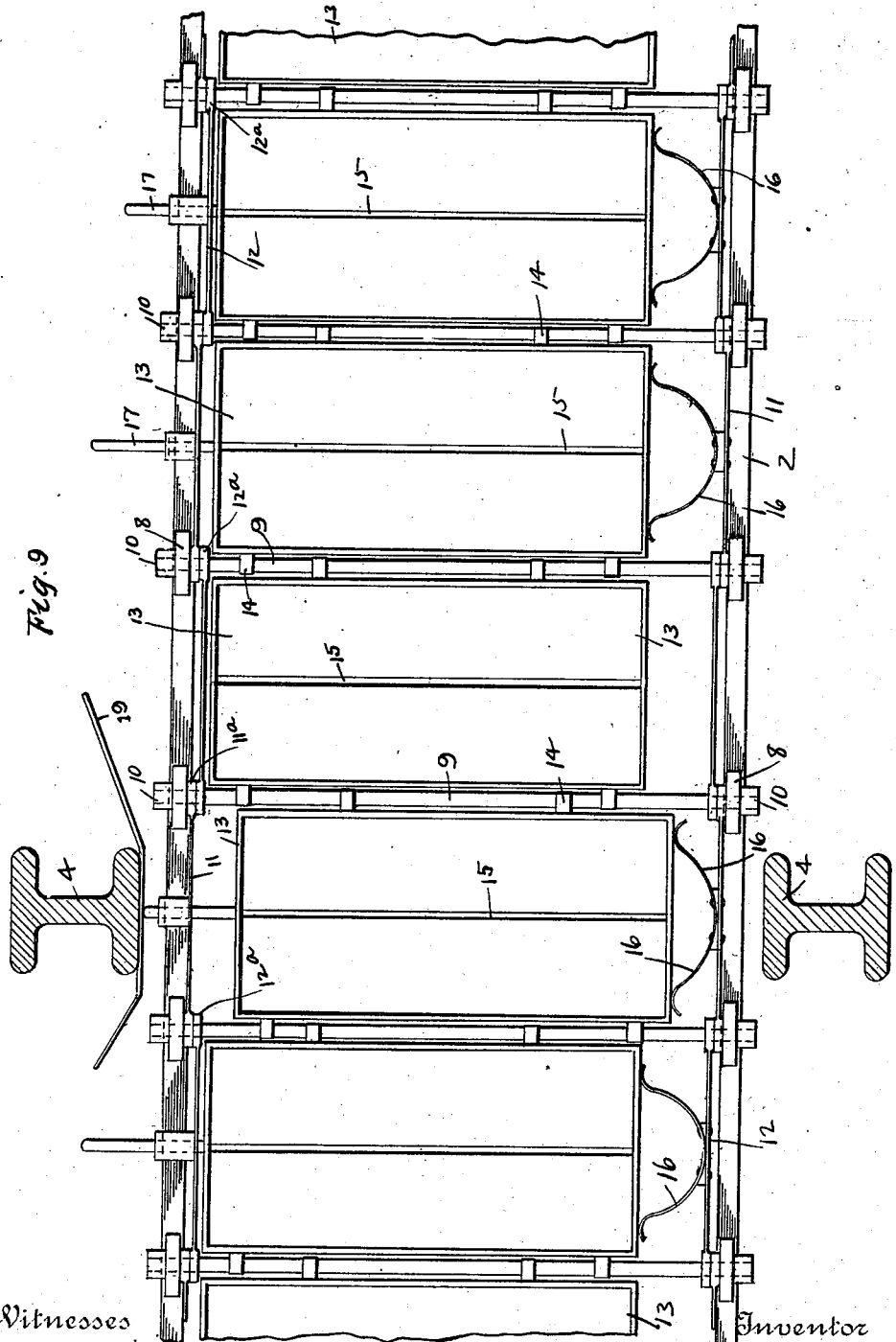

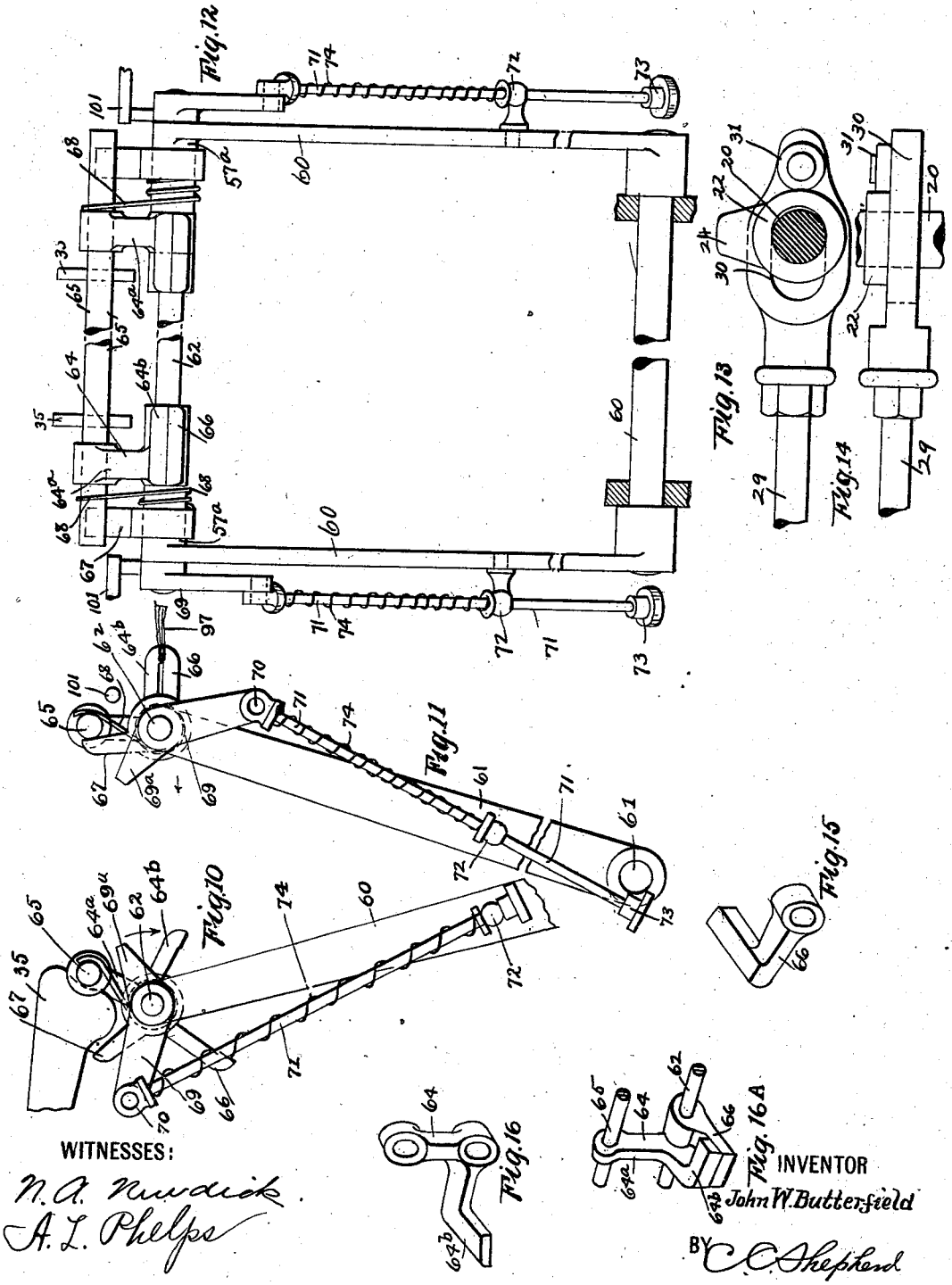

No. 723,825. PATENTED MAR. 31, 1903.
J. W. BUTTERFIELD.
PAMPHLET BINDING MACHINE.
APPLICATION FILED JAN. 5, 1903.
NO MODEL. 11 SHEETS—SHEET 11.

WITNESSES:
N. A. Nurdick
A. L. Phelps

INVENTOR
John W. Butterfield
BY
C. C. Shepherd
ATTORNEY

UNITED STATES PATENT OFFICE.

JOHN W. BUTTERFIELD, OF COLUMBUS, OHIO.

PAMPHLET-BINDING MACHINE.

SPECIFICATION forming part of Letters Patent No. 723,825, dated March 31, 1903.

Application filed January 5, 1903. Serial No. 137,878. (No model.)

*To all whom it may concern:*

Be it known that I, JOHN W. BUTTERFIELD, a citizen of the United States, residing at Columbus, in the county of Franklin and State of Ohio, have invented a certain new and useful Improvement in Pamphlet-Binding Machines, of which the following is a specification.

My invention relates to the improvement of pamphlet-binding machines; and the objects of my invention are to provide an improved mechanism of superior construction and arrangement of parts whereby the covering, stitching, and final folding of pamphlets are attained, to accomplish these objects in a rapid and accurate manner, and to produce other improvements in details of construction and arrangement of parts which will be more fully pointed out hereinafter. These objects I accomplish in the manner illustrated in the accompanying drawings, in which—

Figure 17:
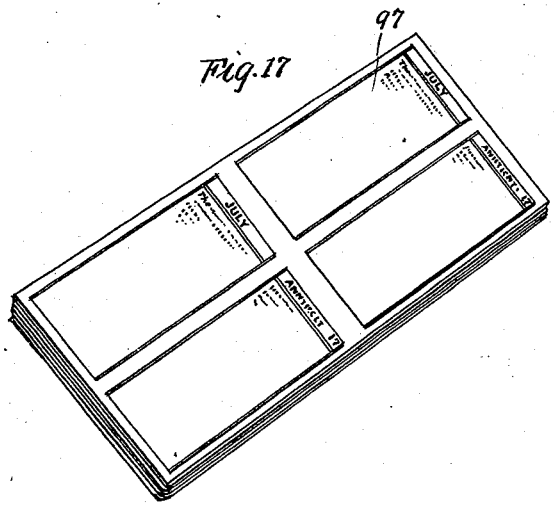
Figure 18:
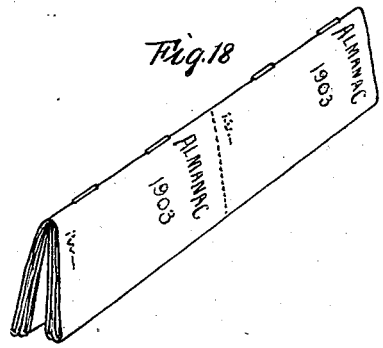

Figure 1 is a side elevation of one half of my improved machine. Fig. 2 is a similar view of the remaining half of said machine. Fig. 3 is a side elevation of the forward half of the machine, taken on the opposite side from that shown in Fig. 2. Fig. 4 is a similar view in elevation of the opposite side of that half of the machine shown in Fig. 1. Fig. 4$^A$ is an enlarged sectional view on line $q\,q$ of Fig. 6. Fig. 5 is a plan view of that portion of the machine illustrated in Figs. 1 and 4. Fig. 6 is a sectional view on line $x\,x$ of Fig. 1. Fig. 7 is a sectional view on line $y\,y$ of Fig. 1. Fig. 8 is a sectional view on line $z\,z$ of Fig. 2. Fig. 9 is an enlarged plan view of a portion of the pamphlet-carrying trays. Fig. 10 is an outer side view of the upper portion of one of the gripper-carrying arms, showing the gripper-jaws open. Fig. 11 is a similar view showing the gripper-jaws closed. Fig. 12 is a detail view showing an end elevation of one set of grippers and the framework in which the same is mounted. Fig. 13 is a detail view in elevation of the upper portion of one of the clencher-frame-operating rods, illustrating its connection with the shaft through the medium of which motion is imparted to said rod. Fig. 14 is a view in elevation of the same, taken at right angles with that shown in Fig. 13. Fig. 15 is a detail view in perspective of one of the lower gripper-jaws, which I employ in the manner hereinafter described. Fig. 16 is a similar view of one of the upper gripper-jaws. Fig. 16$^A$ is a detail view in perspective showing the gripper-jaws assembled. Fig. 17 is a detail view in perspective of a pamphlet in duplicate as the same appears before being fed into my improved machine, and Fig. 18 is a view of the pamphlet in duplicate in bound condition.

For the sake of clearness in illustration I have omitted from the partial side elevations, briefly described above, the various parts on the opposite side of the machine which would be disclosed through the framework thereof.

Similar numerals refer to similar parts throughout the several views.

In carrying out my invention I employ a main framework comprising end or corner standards 1 and horizontal upper and lower beams 2 and 3, said beams being supported partially in said end or corner standards 1 and partially in oppositely-located frame-standards 4, which rise above the upper beams 2, and partially by pillars 5, which connect said beams. Journaled between each pair of end standards 1 is a transverse shaft 6, and on each of these shafts is carried the central portion or hub of a spider-frame 7, each of these hubs having extending therefrom at equidistant points four separated arms, which are indicated at 7$^a$. On the outer end of each of the spider-arms 7$^a$ is formed a fork or bearing-yoke 7$^b$. The upper horizontal frame-beams 2 are utilized as tracks or carrying-rails for wheels or rollers 8, which are carried on the outer end portions of transverse horizontal rods 9, and each of said rollers or wheels is formed, as shown at 10, with an outwardly-projecting hub portion. On the inner side of each of the wheels 8 are mounted loosely on each of said rods 9 the enlarged ends 11$^a$ and 12$^a$ of links or bars 11 and 12, these links or bars extending when horizontal in the direction of the length of the machine and forming, in conjunction with each other, a chain-like connection between the rods 9. Between each pair of the parallel rods 9 is arranged a tray 13, each of these trays being in the nature of a pan-like body and being of less length than the space between the oppositely-located links or bars 11 or 12. Each of the trays has projecting from both its forward and rear sides hinge brackets or projections 14, and through the rearwardly-projecting brackets 14 of one tray and the oppositely-projecting similar brackets of the adjoining tray pass loosely the rods 9, said trays being thus hinged on said rods. This construction is indicated more clearly in Fig. 9 of the drawings. Each of the trays is provided with a central slotted opening 15 in its bottom portion, which extends between the upturned side flanges of said tray. The belt or continuous apron formed by the jointedly-connected trays above described passes over the ends of the machine-frame, the yoke terminations 7$^b$ of the spider-frames being adapted, as shown in Figs. 1, 2, 3, and 4, to form bearings for the hub projections 10 of the wheels or rollers 8. With the exception of every third bar or link 11 12 on one side of the machine each of said bars or links has secured to its inner side at the center of its length the central portion of an outwardly-bowed spring-strip 16, the outturned end portions of the latter being adapted to contact with the adjacent end of the corresponding tray. Each of the two successively-arranged trays, which are carried opposite the links or bars having the springs 16, is provided on the opposite side from that on which the spring is employed with an outwardly-projecting pin 17, these pins passing loosely through outwardly-extending guide projections 18 on the links or bars 12 or 11 on the corresponding side of the machine.

As indicated in Fig. 9 of the drawings, the pins 17 of the adjoining trays are formed of different lengths, for the reason hereinafter explained. One of the frame-standards 4 has secured thereto the central portion of a bar 19, the end portions of the latter inclining outwardly.

Journaled in two rearwardly-projecting arms 4$^a$ of the upper portion of the frame-standards 4 is a transverse shaft 20, this shaft being indicated more clearly in Figs. 5, 1, and 4. On one of its outer ends and on the outer side of the machine-frame the shaft 20 carries a gear-wheel 21. On the shaft 20 near each of its ends is carried a cam-collar 22, each of said collars having a tooth-like cam projection 24. (See Figs. 13, 14, and 5.) Between the parts 20$^a$ of the shaft 20 said shaft has mounted thereon a plurality of miter-wheels 25 and near the center of its length said shaft also carries a cam-body 26, having a tooth-like projection 26$^a$. The cam projection 26$^a$ is adapted at each revolution of the shaft 20 to come into contact with a projecting trigger 27, which is carried on a horizontal shaft 28, which is journaled in the side framework of the machine and which lies parallel with the shaft 20 and above the latter. On each side of the machine I provide an inclined rod 29, the upper and enlarged end portion of which is provided with an elongated slot 30, which imparts, as shown more clearly in Figs. 13 and 1, a substantially link form to said rod termination. On one side of the extremity of this link-shaped rod termination is pivoted a friction-roller 31. Through the slotted openings 30 of these rod terminations pass loosely the end portions of the shaft 20, the relative positions of the parts being such as to bring the rollers 31 in the paths of the cam projections 24 when the shaft 20 is rotated. At its lower end each of the rods 29 is pivotally connected with a slightly angular bar 32, this connection being formed near the center of the length of the latter. At its rear end each of the bars 32 has a link termination 33, and at its forward end said bar is pivoted, as indicated at 32$^a$, to the lower end of a bracket or hanger 34, which depends from the side of the corresponding frame-bar 2. With an upward extension 34$^a$ of each of the brackets 34 is connected a short forwardly-extending stop-arm 35, the latter having a slightly-enlarged head presenting an inclined face, as shown, these stop-arms being adapted in the manner hereinafter described to be employed in connection with the operation of the gripping mechanism. The slot or elongated opening of the head or end 33 of each of the bars 32 has loosely extending therethrough a pin 36, which projects (see Figs. 1 and 6) from a vertically-sliding block 37, which is loosely mounted on a vertical pin 38$^b$, which depends from the under side of the corresponding frame-bar 2. Each of these sliding blocks 37 has extending upward and slightly inward therefrom an arm 37$^a$, said arms being connected with the downwardly-extending end portions 38$^a$ of a transverse folding bar or knife 38. As shown in Fig. 6 of the drawings, the normal position of the upper edge of the folding-knife is in close proximity to the under side of the trays.

Between the forward and horizontal portions of the bars 32 extends the transverse bar 39. (See Figs. 7 and 1.) Above this bar extends in a direction parallel therewith between the frame-standards 4 a stretcher-rod 40, and mounted on the latter at intervals are the supports 41 of ordinary clencher-heads 42, the latter having their upper terminations in close proximity to the under sides of the trays 13. Working upward through the supports 41 and clencher-heads 42 in the usual manner are the usual vertical clencher-rods 43, the latter being provided below the supports 41 with the shoulders 44, between which and the upper side of the bar 39 are interposed springs 45.

Extending between the upper ends of the frame-standards 4 is a transverse rod 46, on which is mounted at intervals the heads of staple forming and driving devices, which are indicated at 47, these devices being of that well-known construction in which mechanism is provided for forming staples from wires which run into said devices between feed-rollers, such as are indicated at 48 in Fig. 7, and in which an internal staple-forming plunger and driver are employed in the usual manner, these being operated through the gearing of miter-wheels 49, mounted on the outer ends of shafts running within laterally-extending arms 47ª of said devices, said miter-wheels gearing with the miter-wheels 25 on the shaft 20.

It will be understood that the staple forming and driving bodies are located vertically above the clencher-heads 42. The outer portions of the arms 47 of the staple devices are provided with upwardly-projecting bearings 47ᵇ, through which pass a supporting-rod 50, as shown more clearly in Fig. 5.

On one end of the shaft 6 is pivoted a bell-crank 54. (See Fig. 4.) With one arm of the bell-crank 54 is pivotally connected the rear end of a forwardly-extending bar 55, the latter being shown more clearly in Figs. 4 and 3 of the drawings. The forward end of the bar 55 is pivotally connected with a laterally-projecting pin 56, which is formed central on one of two oppositely-located gripper-bars 57, which are arranged on opposite sides of the machine and which have their lower ends connected with a transverse shaft 58, which is journaled in the side frame-pieces 3. With each of the bars 57 is pivotally connected a forwardly-extending connecting-bar 59, these connecting-bars being pivotally connected at their forward ends with gripper-bars 60, corresponding with the bars 57 and arranged at the forward end of the machine, said bars 60 being carried on the ends of a transverse journaled shaft 61, corresponding with the shaft 58. The upper ends of the bars 57 and 60 have journaled therein transverse shafts 62. On each of the shafts 62 are mounted adjacent to the laterally-extending hub terminations 57ª of the bars 57 and 60 fixed gripper-jaws 64, each of the latter comprising an upwardly-extending arm 64ª, through which passes an upper transverse rod 65 and an outwardly-projecting angular gripper-jaw arm 64ᵇ. Adjoining each of the gripper-bodies 64 is the inner end or hub portion of an angular gripper-jaw arm 66, one of these jaw-arms 66 being journaled on each of the shafts 62, adjacent to each of the jaw-arms 64, and the outwardly-extending members of said jaw-arms extending, as shown more clearly in Fig. 16ᴬ of the drawings, parallel with the upper jaw projection 64ᵇ and beneath the latter. On each of the laterally-projecting hub portions 57ª of the bars 57 and 60 is secured the lower end of an upwardly-extending stop-finger 67, the latter adapted, as shown more clearly in Figs. 11 and 12 of the drawings, to contact with the rod 65. The fingers 67 are normally contained in contact with the upper rod 65 through the medium of springs 68, said springs having their lower portions connected with the hub-like extensions 57ª of the bars 57 and 60 and having their upwardly-extending portions bearing against the opposite side of the rods 65 from those on which the fingers 67 contact. On the outer end of each of the shafts 62 is carried an obtuse-angled bell-crank 69, and the lower and longer arm of this bell-crank is pivotally connected at 70 with the head or upper end of a downwardly-extending rod 71, which passes through a bracket 72, which is pivoted to the outer side of the adjoining bar 57 or 60. The rod 71 is provided with an enlarged lower termination 73 and between the upper enlarged head portion of said rod and the bracket 72 is interposed a spring 74, which is normally under compression.

Extending outward and upward from the side frame-bars 2 near the rear end of the machine are brackets 75, (see Figs. 6 and 4,) each of these brackets having a rearwardly-extending upper arm 75ª. In the bracket-arms 75ª are journaled the end spindles of two folding-rollers 76, these rollers being arranged one in front of the other and the rear roller having its ends pivoted in sliding blocks 77, which are adjustably mounted in slotted openings 75ᵇ of said bracket-arms 75ª. The rollers 76 are held in desirable relation with each other through the medium of adjusting-screws 78, which pass through threaded openings in the ends of the bracket-arms 75ª and bear against the sliding blocks 77. These folding-rollers are provided on corresponding ends with pinions 79 and 80, which gear one with the other, (see Fig. 4ᴬ,) and the pinion 79 gears with a gear-wheel 81, carried on a transverse shaft 82, which is also journaled in the brackets 75. On one of its outwardly-extending end portions the shaft 82 carries tight and loose pulleys 83 and 84 and on the outer side of the latter a fly-wheel 85. The shaft 82 also carries a pinion 86, which meshes with the gear-wheel 21.

Upon the main shaft 20 (see Figs. 4 and 6) is carried a crank 87, with the pin 87ª of which is connected the upper end of a downwardly and rearwardly extending connecting-bar 88, the lower end of said bar being pivotally connected with one arm of the bell-crank 54, heretofore described. Upon the shaft 6 is carried a wheel 89 of substantially ratchet form, said wheel having formed therein at equidistant points on its periphery recesses and consequent shoulders, such as are indicated at 90, there being four of said recesses or notches. That inwardly-projecting pin 91 of the bell-crank 54 through the medium of which connection between said bell-crank and the bar 55 is effected also carries pivotally thereon one end of a pawl 92, the free end of said pawl being adapted to bear upon the periphery of the wheel 89 and to drop successively into the notches or recesses 90 thereof and engage the shoulders formed by said notches or recesses. Suspended from the shaft 28 (see Figs. 6 and 5) are the end arms 93 of a transverse swinging packer-plate 94, the latter, as shown in Fig. 4 of the drawings, depending in front of a book or pamphlet receiving box 95, which is suitably supported opposite the upper and rear portion of the machine.

In operation the unbound leaves of the books or pamphlets are, as indicated more clearly in Fig. 17 of the drawings, in the nature of previously-printed sheets on which two or more sets of pamphlet-leaves are printed, the printed sheets thus provided being folded into the substantially oblong form shown in said Fig. 17. In preparing the body of the pamphlet to be operated upon by my improved machine the pages are printed upon a sheet or web, which is folded to form the substantially oblong body shown in Fig. 17 of the drawings, the pages being arranged on opposite sides of the center of the length of each fold thereon but without the final fold, which is afterward applied by my improved mechanism and which final fold extends throughout the length of said oblong-folded body between the pages. While in this form the bodies of the pamphlets are fed from a feed-board, such as is indicated at 96, into the trays 13, the centers of the widths of the pamphlets thus being brought over the central slotted opening 15 of the trays in which said pamphlets rest. In order to illustrate the operation of depositing the pamphlets in the successively-arranged trays, we will assume that one of the pamphlets 97 has, as indicated in Fig. 11 of the drawings and in the manner hereinafter described, had its edge portion gripped by the gripper-jaws 64$^b$ and 66. Through a belt running on the power-wheel 83 rotary motion is imparted to the shaft 82, and through the pinion 86 and gear-wheel 21 motion is contributed to the shaft 20. (See Fig. 5.) Through the rotation of the shaft 20 and a consequent movement of the crank 87 a reciprocating motion is imparted to the bar 88. (See Fig. 4.) At the downward movement of this bar 88 the bell-crank 54 is sufficiently swung on the shaft 6 to cause, through the engagement of the pawl 92 with one of the teeth of the wheel 89, a quarter-revolution of the latter in the direction of the arrow indicated in Fig. 4. The partial rotation thus imparted to the shaft 6 results in a corresponding movement of the connected trays 13. The movement of the bell-crank 54, above described, results in such rearward movement of the bar 55, arms 57, bars 59, and rearward-swinging movement of the gripper-carrying arms 60 as to result in the pamphlet previously held in the jaws of the grippers carried by said arms 60 being carried over one of the trays 13 and deposited in said tray. The operation of depositing the pamphlet within the tray may be described as follows: As the gripper-carrying arms 60 are swung rearward the shaft 65 comes into contact with the cam projections 35, resulting in arresting the rearward movement of said shaft 65, and the movement of the arm 60 continuing to the end of its throw, which is limited by the movement of the bell-crank 54, the upper gripper-jaws 64$^b$ will be forced downward in the direction indicated by the arrow in Fig. 10. The downward movement of this upper gripper-jaw causes a corresponding downward and rearward swinging movement of the lower gripper-jaw and a consequent partial revolution of the shaft 62, on which said lower jaw is fixed. The resistance to this movement offered by the compression of the spring 74 results in a continuation of the grip of the jaws upon the pamphlet. When, however, the arms 60 approach their limit of rearward movement and the centers of the shaft 62 and pin 70 have passed out of alinement with the axis of the rod 71, it is obvious that the compression of the spring 74, which has resulted from the above-described operation, will cause the lower arm of the bell-crank 69 to swing quickly to the position indicated in Fig. 10, thereby throwing the gripper-jaw 66 out of contact with the upper jaw 64$^b$ and dropping the pamphlet-body into the tray.

For the purpose of more clearly illustrating the steps of the operation we will assume that the tray which in Fig. 3 is marked A is that in which the pamphlet-body has been deposited, as previously described. The completion of the revolution of the shaft 20 results in an upward and forward movement of the bar 88 and in such forward swinging movement of the bell-crank 54 and forward movement of the bar 55 and bars 59 as to cause the gripper-carrying arms 57 and 60 to be again thrown to their forward positions, which positions are shown in Figs. 2 and 3. Another partial revolution of the shaft 20 results, in the manner heretofore described, in imparting a temporary traveling movement to the connected trays and in a rearward swinging movement of the gripper-arms 57 and 60. In this manner the tray A is moved forward a distance equal to its width, and the next succeeding tray 13 is brought into the position previously occupied by the tray A, in which position it has deposited therein a pamphlet in the manner heretofore described. At the next operation or movement of the trays and movement, as heretofore described, of the gripper-arms it will be understood that the tray A will be brought to the position indicated at A' in said Fig. 3, in which position the forward end of said tray A' is adjacent to the lower and inner or rear end of an upwardly-inclined cover feed-board 100.

I have heretofore described the operation of moving the gripper-arms rearward and depositing a pamphlet in the tray. I will now proceed to describe the operation of returning the gripper-jaws to the position indicated in Fig. 11. In the forward movement of the gripper-arms 57 and 60 it will be seen that the shafts 65 will move out of contact with the heads 35 and that the spring 68 will act to press the said shafts 65 into contact with the stop-fingers 67. This movement of the arms 64$^a$ results in raising their jaw portions 64$^b$, and the forward movement of the gripper-arms 57 and 60 results in the contact of the under sides of the shorter arms 69$^a$ of the bell-cranks 69 with fixed studs or stop-pins 101, which are supported from the side frames of the machine. This latter contact, in conjunction with the continued forward movement of the gripper-arms, results in a turning of the shafts 62 and in a forward swinging movement of the longer arms of the bell-cranks 69. When these bell-crank arms have passed the point where the centers of the shafts 62 and pins 70 are in alinement with the axes of the rods 71, it is obvious that the compression of the springs 74 will result in both the longer arms of the bell-cranks and the lower jaws 66 being swung quickly upward and forward until said lower jaws are in gripping contact with the upper jaws $64^b$. Prior to this last-described upward movement of the lower jaws carried by the arms 60 one edge of the pamphlet-body is so fed or supported as to insure said edge portion being gripped between the said jaws in the manner indicated in Fig. 11. It will be seen that the upward movement of the lower jaws will be limited by their gripping contact with the upper jaws and that the latter will be prevented from further upward movement by a contact of the shafts 65 and stop-fingers 67. It will also be seen that the rearward and upward movement of the bell-cranks 69 and rods 71 will be limited by the contact of the heads or flange projections 73 of the rods 71 with the under sides of the brackets 72.

Upon the cover feed-board 100 are supported pamphlet cover-sheets which are of such size and shape as to cover one face of the pamphlet-body. (Shown in Fig. 17.) It will be understood that the gripper-jaws carried by the gripper-arms 57 are adapted to successively grip, carry forward, and deposit in the trays the cover-sheets which are fed from the board 100, and assuming that that tray which received the pamphlet-body in the manner first described is in the position indicated by A' it is obvious that the action of the gripper-jaws and connected mechanism carried by the arms 57 will result in a cover-sheet being carried over and deposited on the upper side of said pamphlet-body within said tray A'.

Assuming now that the first filled tray has reached the position indicated at $A^2$ through the successive quarter-revolutions of the wheel 89, the rotation of the shaft 20, hereinafter described, results in imparting through the buffer-gear connections 25 and 49 (see Fig. 5) an operation to the staple forming and driving mechanism, through the medium of which operation the staples (the points of one of which are shown at 102 in Fig. 7) are driven downward through the pamphlet and cover at the centers of their widths, the ends of said staples passing through the slotted opening 15 of the tray in which the pamphlet is supported. Beneath this tray the staple ends are met and clenched by the upward movements of the clencher-heads 42. This upward movement of the clencher-heads is effected through the raising of the bar 39 against the springs 45, which in turn exert pressure against the shoulders 41 of the rods 43. The bar 39 receives its upward movement from the upward movement of the bars 32, the latter being operated through a reciprocating motion of the connecting-bars 29. By reference to Figs. 13 and 14 of the drawings it will be understood that this reciprocating motion of each of the bars 29 is produced by the rotation of the shaft 20 and the consequent lifting contact of the cams 24 with the rollers 31 at each revolution of said shaft 20. The tray having been advanced to the position indicated at $A^3$ in Fig. 4, the upward movement of the bars 32, produced in carrying out the clenching operation on the pamphlet of the next succeeding tray, results also, through the connections heretofore described, in an upward movement of the knife-arms $37^a$ and in a consequent forcing of the knife blade or body 38 through the slotted opening of the tray indicated at $A^3$. This upward movement of the knife-blade brings the same into contact with the center of the width of the pamphlet-body contained therein, moving the latter upward and feeding it centrally between the folding-rollers 76. Motion in opposite directions is imparted to these folding-rollers through the gear-wheels 81, 79, and 80, the arrangement of which has been heretofore described. (See Fig. $4^A$.) In this manner by the pressure of the rollers the pamphlet-body is thus folded or doubled lengthwise and in said folded condition is carried upward opposite the swinging packer-plate 94 and open end of the receiving-box 95. The folded pamphlet-body is forced or fed into said receiving-box through the swinging movement of said packer-plate, which is caused by contact of the trigger 27 with the cam 26 at each revolution of the shaft 20.

It is well known that when a plurality of staple-bound pamphlets are placed one upon or against the other and when the staples of said pamphlets are in corresponding positions an undesirable inequality of thickness of the package is attained at the stapled points, resulting in such lack of uniformity in thickness of the body formed by the collection of pamphlets as to interfere greatly with the operation of trimming the unbound edges of the sheets or leaves which comprise the pamphlets. In order to overcome this difficulty, I employ means heretofore described for preventing the staples being inserted at corresponding points in the pamphlets. The operation by which this object is attained is as follows: Assuming that one of the trays which is provided with the longer pin 17 at one end and one of the springs 16, bearing upon its opposite end, is approaching the point where its slotted opening 15 will receive the staples or approaching the position occupied by the tray, (indicated in Fig. 4 at $A^2$,) the pin 17 comes into contact with one of the inclined end portions of the bar 19, (see Fig. 9,) with the result that when the tray has reached that position in which its slotted opening 15 is immediately below the stapling-heads and above the clenchers said tray will have been forced laterally to the position indicated in dotted lines in said Fig. 9. After passing the stapling-point and after the pin 17 has passed out of contact with the rear end portion of the bar 19 it is obvious that the spring 16 will act to return the tray to its normal position. When the next succeeding tray, which is provided with the shorter pin 17, is moved to the stapling-point, it will be understood that said tray will not be moved laterally to the extent of the preceding tray, owing to the difference in the length of its projecting pin 17. The third or next succeeding tray being unprovided with a projecting pin remains in its normal position. It will thus be seen that by varying the stapling-points on the pamphlets which comprise each set of three every fourth pamphlet only will be stapled at corresponding points and that a greater uniformity in thickness of a body of assembled pamphlets will be attained.

From the construction and operation herein described it will be seen that improved means are provided for covering, binding, and imparting the final folds to pamphlet-bodies prior to separating the same into books.

Having now fully described my invention, what I claim, and desire to secure by Letters Patent, is—

1. In a pamphlet-binding machine, the combination with a plurality of traveling trays, each having an opening in its lower side, of a stapling mechanism arranged adjacent to said trays and means for producing a separate operation of said stapling mechanism whereby staples are driven through the openings of the trays and through pamphlet-bodies contained therein.

2. In a pamphlet-binding machine, the combination with a plurality of trays hinged one to the other, each of said trays having a slotted opening therein and means for imparting a traveling motion to said trays, of a stapling mechanism arranged adjacent to the upper line of trays and means for producing separate operations of said stapling mechanism whereby staples are driven through the slotted openings of the trays and through the center of pamphlet-bodies contained therein.

3. In a pamphlet-binding machine, the combination with a plurality of trays hinged one to the other, each of said trays having an opening in its lower side and means for imparting a traveling motion to said trays, of gripping mechanism comprising automatically-operated gripping-jaws adapted to successively grip and feed into said trays unstapled pamphlet-bodies, substantially as specified.

4. In a pamphlet-binding machine, the combination with a plurality of hinged pamphlet-carriers and means for imparting an intermittent traveling motion to the latter, of gripping mechanism comprising automatically-operated gripper-jaws adapted to grip and feed pamphlets onto said carriers at regular intervals and means for driving binding-staples through said pamphlet-bodies while the same are contained on said carriers.

5. In a pamphlet-binding machine, the combination with a plurality of trays hinged one to the other, and means for imparting an intermittent traveling motion to said trays, of swinging gripper-arms, a pamphlet-body-gripping mechanism carried by said arms, said gripping mechanism comprising automatically-operated jaws, and means whereby a pamphlet-body gripped in said jaws is by the motion of said gripper-arms delivered upon one of said trays and released when so delivered from said jaws and said gripper-arms swung to their normal positions, substantially as specified.

6. In a pamphlet-binding machine, the combination with a plurality of traveling hinged trays, of two sets of swinging gripper-arms arranged one in rear of the other, and gripping mechanism carried by each set of said arms and comprising automatically-operated gripper-jaws and means for opening and closing the same, substantially as specified.

7. In a pamphlet-binding machine, the combination with a plurality of trays hinged one to the other, each of said trays having an opening in its lower side and means for imparting a traveling motion to said trays, of two sets of gripping mechanism and means for automatically operating the same whereby one of said sets may deliver onto one of said trays a pamphlet-body and whereby the remaining set may deliver within one of said trays upon a previously-deposited pamphlet-body a cover-sheet, a stapling mechanism arranged adjacent to said trays and means for producing separate operations of said stapling mechanism whereby staples are driven through openings of the trays and through said pamphlet-bodies and covers contained therein, substantially as specified.

8. In a pamphlet-binding machine, the combination with a plurality of hinged trays or carriers having openings in their lower sides and means for imparting a traveling motion to said trays, of a stapling mechanism arranged adjacent to said trays and adapted to insert staples through the openings thereof and through pamphlet-bodies previously deposited in said trays, oppositely-rotated parallel folding-rolls and means for forcing the stapled pamphlet-bodies in a doubled form between said rollers, substantially as specified.

9. In a pamphlet-binding machine, the combination with a plurality of hinged trays or carriers having openings in their lower sides, and means for imparting an intermittent traveling motion to said trays, of a stapling mechanism arranged adjacent to said trays and adapted at intervals to insert staples through the openings thereof and through pamphlet-bodies previously deposited in said trays, oppositely-rotated parallel folding-rolls mounted above the upper line of trays, a folding knife or bar movably supported beneath said upper line of trays and means for forcing said knife upward through a bottom opening of one of said trays, thereby forcing the pamphlet-body contained in said tray upward and between said rolls, substantially as specified.

10. In a pamphlet-binding machine, the combination with a plurality of hinged trays or carriers having openings in their lower sides and means for imparting a traveling motion to said trays, of a stapling mechanism arranged adjacent to said trays and adapted to insert staples through the openings thereof and through pamphlet-bodies previously deposited therein, oppositely-rotated parallel folding-rolls mounted above the upper line of trays, a folding knife or bar movably supported beneath the upper line of trays, a pamphlet-body-receiving case as 95 supported above the rear end portion of the machine, a pivoted packing-plate 94 normally depending in front of the open forward end of said case, means for moving said knife-blade successively through the tray-openings and forcing the pamphlet-bodies contained therein upward between the folding-rolls and means for imparting a swinging motion to said packing-plates whereby the pamphlet-bodies on passing from the folding-rolls are moved into said receiving-case, substantially as specified.

11. In a pamphlet-binding machine, the combination with a plurality of trays jointedly connected with each other and independently movable laterally, each of said trays having a bottom opening therein as 15, and means for imparting an intermittent traveling movement to the connected trays, of a stapling mechanism arranged adjacent to said trays and adapted to drive staples through the openings in the trays and means for moving certain ones of said trays laterally as the stapling-point is approached and for returning said laterally-moved trays to their normal positions in the chain of trays after the stapling operation, substantially as specified.

12. In a pamphlet-binding machine, the combination with a plurality of jointedly-connected pamphlet-carrying trays having openings in their lower sides, said trays being laterally movable independently, a compressible spring bearing against corresponding ends of certain of said trays and pins 17 of different lengths projecting from the opposite ends thereof, of a fixed bar adjacent to the line of trays, said bar having its end portions outwardly inclined and the pins 17 of said trays adapted to contact with the inner face of said bar in passing the same and means for imparting a traveling motion to said trays, substantially as specified.

JOHN W. BUTTERFIELD.

In presence of—
C. C. SHEPHERD,
A. L. PHELPS.